April 29, 1958     H. S. YOUNGS     2,832,581
FORCE MEASURING APPARATUS
Filed April 20, 1955
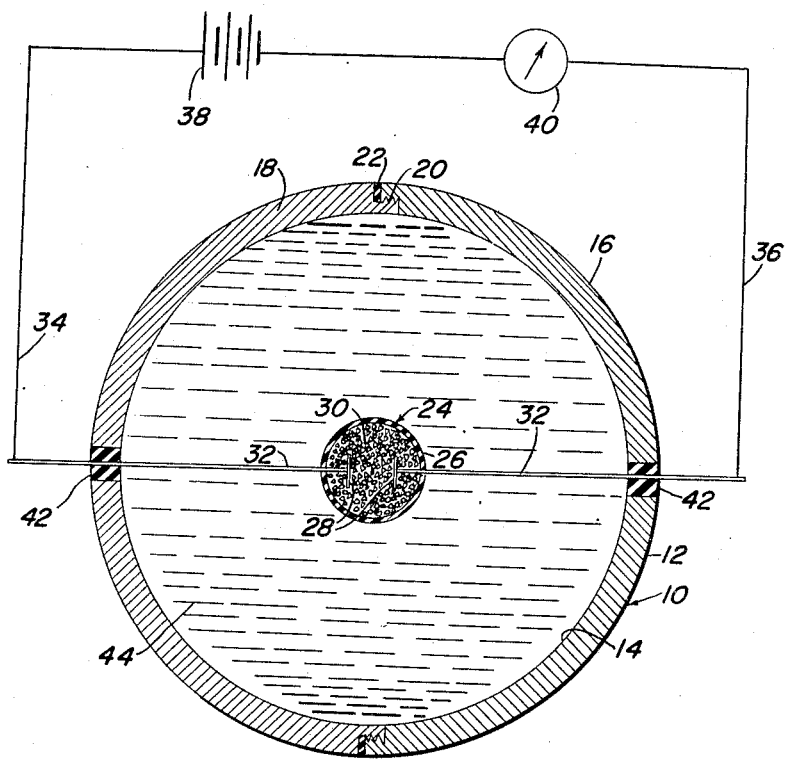
INVENTOR
HOMER S. YOUNGS
BY
ATTORNEY United States Patent Office 2,832,581
Patented Apr. 29, 1958

2,832,581

FORCE MEASURING APPARATUS

Homer S. Youngs, Oakton, Va., assignor to Reed Research, Inc., Washington, D. C., a corporation of Delaware Application April 20, 1955, Serial No. 502,563

7 Claims. (Cl. 264—1)

This invention relates to force measuring apparatus particularly intended to respond to magnitude independently of direction.

The apparatus is eminently suited for use as an accelerometer which is omnidirectional in its performance, being also applicable under certain conditions for the measurement of pressures independently of their direction.

It is among the objects of the invention to provide force measuring apparatus comprising a substantially spherical fluid tight housing, a relatively small pressure-sensitive transducer centrally disposed within the housing, spacing means substantially uniformly interposed between the transducer and housing positioning the transducer centrally of the housing and transmitting forces to the transducer, and an indicating device coupled with the transducer disposed externally of the housing providing an indication of the forces. The spacing means may comprise a substantially homogeneous body of material substantially filling the housing and surrounding the transducer, and where such body is a liquid it will preferably have a specific gravity substantially equal to that of the transducer to neutralize the effects of buoyancy. The spacing means may comprise two or more radial suspending elements, some or all of which may also serve to couple the transducer with the externally disposed indicating device.

The transducer may have a conducting characteristic, such as its resistance, which varies with pressures applied thereto, but in any event, it should respond substantially equally to forces applied thereto which are equal in magnitude regardless of their directions of application. The housing is substantially rigid where the apparatus is to serve as an accelerometer as compared with a non-rigid shell which would be used for the measurement of transmitted pressures.

A more complete understanding of the invention will follow from a description of the accompanying drawing showing a simple form of the apparatus schematically.

A housing 10 havinng a spherical external wall 12 and a spherical internal wall 14 is formed from two hemispheres 16 and 18 secured together by screw threads 20 in fluid tight relationship by the interposition of a gasket 22 between them.

Centrally disposed within the housing 10 is a transducer 24 comprising a substantially spherical flexible membrane 26 enclosing small conductive plates 28 and otherwise filled with small carbon particles 30. Conductive radial elements 32 maintain the transducer centrally disposed and serve as conductors terminating in the plates 28 and externally of the housing for connection with leads 34 and 36 in series with a current source 38 and an indicating device 40 which may be a galvanometer, milliammeter or other suitable indicating or recording instrument.

The conductors 32 are suitably sealed through the walls of both the elastomeric or other membrane 24 and the housing 10. The sealing material 42 provided between the conductors 32 and the housing 10 will conform with the fluid tight requirements of the housing and will preferably have a rigidity of the same order as that of the housing itself.

The spacing means substantially uniformly interposed between the transducer and housing includes a filling 44 shown as a substantially incompressible liquid filling the housing and surrounding the transducer.

Where the wall of the housing 10 is substantially rigid, the device is admirably suited to serve as an accelerometer whose indications will be responsive to magnitudes and independent of their directions. Inasmuch as the transducer is maintained centralized within the housing and its dimensions are relatively small as compared with those of the housing, its sensitivity and accuracy are exceptionally good.

The central disposition of the transducer and its small size relative to the housing are also important even where a non-rigid housing is employed for the measurement of ordinary pressures.

These relationships are unlike those encountered in underwater sound transmitting and receiving equipments, many of which superficially resemble the present apparatus but none of which could replace it satisfactorily for any purpose, particularly where the rigid shell or housing is provided for the measurement of acceleration.

The form of the invention depicted by the drawing has been selected as merely an illustration since those skilled in the art will recognize the possibility of a vast number of modifications, many of which have already occurred to the present inventor. Accordingly, the invention should not be restricted to the illustrated form beyond the scope of the appended claims.

I claim:

1. Force measuring apparatus comprising a substantially spherical fluid tight housing, a relatively small pressure-sensitive transducer centrally disposed within said housing, spacing means substantially uniformly interposed between said transducer and housing positioning said transducer centrally of said housing and transmitting forces to said transducer, and an indicating device coupled with said transducer disposed externally of said housing providing an indication of said forces, said spacing means including a body of substantially incompressible liquid substantially filling said housing and surrounding said transducer.

2. Force measuring apparatus as set forth in claim 1 wherein said body of liquid has a specific gravity substantially equal to that of said transducer.

3. Force measuring apparatus comprising a substantially spherical fluid tight housing, a relatively small pressure-sensitive transducer centrally disposed within said housing and substantially equidistant from said housing along all radii, spacing means substantially uniformly interposed between said transducer and housing positioning said transducer centrally of said housing and transmitting forces to said transducer, and an indicating device coupled with said transducer disposed externally of said housing providing an indication of said forces.

4. Force measuring apparatus as set forth in claim 3 wherein said spacing means includes a radial element secured to said housing and transducer.

5. Force measuring apparatus as set forth in claim 3 wherein said transducer has a conducting characteristic varying with pressure applied thereto.

6. Force measuring apparatus as set forth in claim 3 wherein said transducer responds substantially equally to equal forces independently of their directions.

7. Force measuring apparatus as set forth in claim 3 wherein said housing is rigid.

References Cited in the file of this patent

UNITED STATES PATENTS

| | | |
|---|---|---|
| 2,338,732 | Nosker | Jan. 11, 1944 |
| 2,650,991 | Ketchledge | Sept. 1, 1953 |

FOREIGN PATENTS

| | | |
|---|---|---|
| 174,095 | Great Britain | Jan. 9, 1922 |